United States Patent [19]

Ohsawa

[11] Patent Number: 5,790,195
[45] Date of Patent: Aug. 4, 1998

[54] IMAGE PROCESSING APPARATUS

[75] Inventor: Hidefumi Ohsawa, Kawaguchi, Japan

[73] Assignee: Canon Kabushiki Kaisha, Tokyo, Japan

[21] Appl. No.: 363,893

[22] Filed: Dec. 27, 1994

[30] Foreign Application Priority Data

Dec. 28, 1993 [JP] Japan .................................. 5-335395

[51] Int. Cl.$^6$ .................................................. H04N 7/30
[52] U.S. Cl. ................................................ 348/419; 382/261
[58] Field of Search ........................... 348/614, 419, 348/405, 397, 400, 415, 420, 571, 607, 625; 382/260, 261, 262

[56] References Cited

U.S. PATENT DOCUMENTS

| | | | |
|---|---|---|---|
| 5,089,889 | 2/1992 | Sugiyama | 348/405 |
| 5,267,037 | 11/1993 | Sugiyama | 348/415 |
| 5,283,656 | 2/1994 | Sugahara | 348/420 |
| 5,285,279 | 2/1994 | Sakamoto et al. | 348/614 |
| 5,367,335 | 11/1994 | Murakami et al. | 348/419 |
| 5,579,051 | 11/1996 | Murakami et al. | 348/415 |

*Primary Examiner*—Amelia Au
*Attorney, Agent, or Firm*—Fitzpatrick, Cella, Harper & Scinto

[57] ABSTRACT

The invention provides an image processing apparatus comprising: an activity detecting unit for detecting an activity of input image data, a processing unit for space filter processing the input image data by controlling filter coefficients in accordance with the activity detected by the activity detecting unit, and an encoding unit for encoding the input image data processed by the processing unit. An image processing apparatus comprising, an activity detecting unit for detecting an activity of input image data, and a quantizing unit for quantizing the input image data by controlling a quantization step in accordance with the activity detected by the activity detecting unit is also provided.

14 Claims, 12 Drawing Sheets

F I G. 3
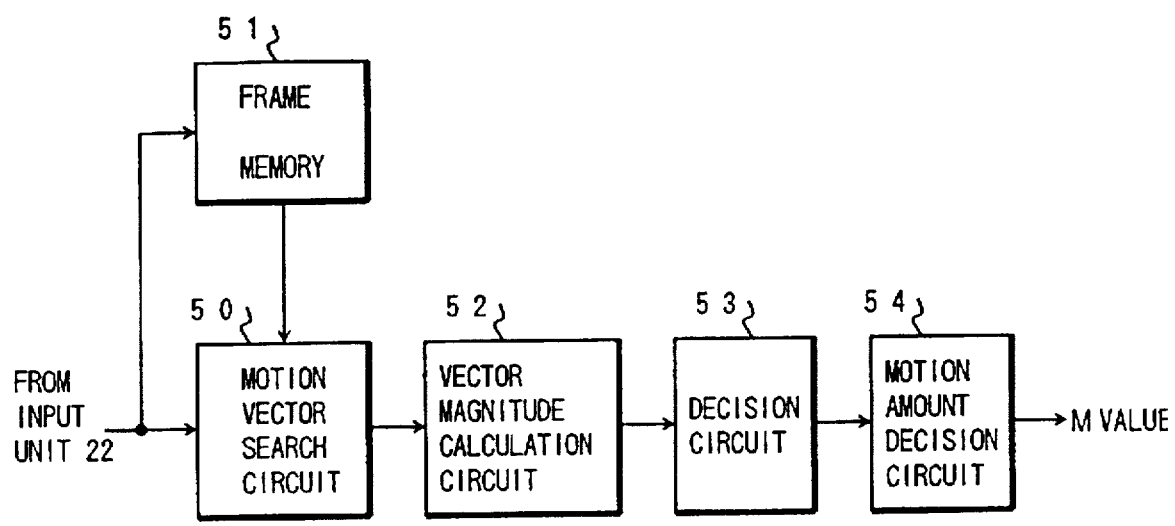

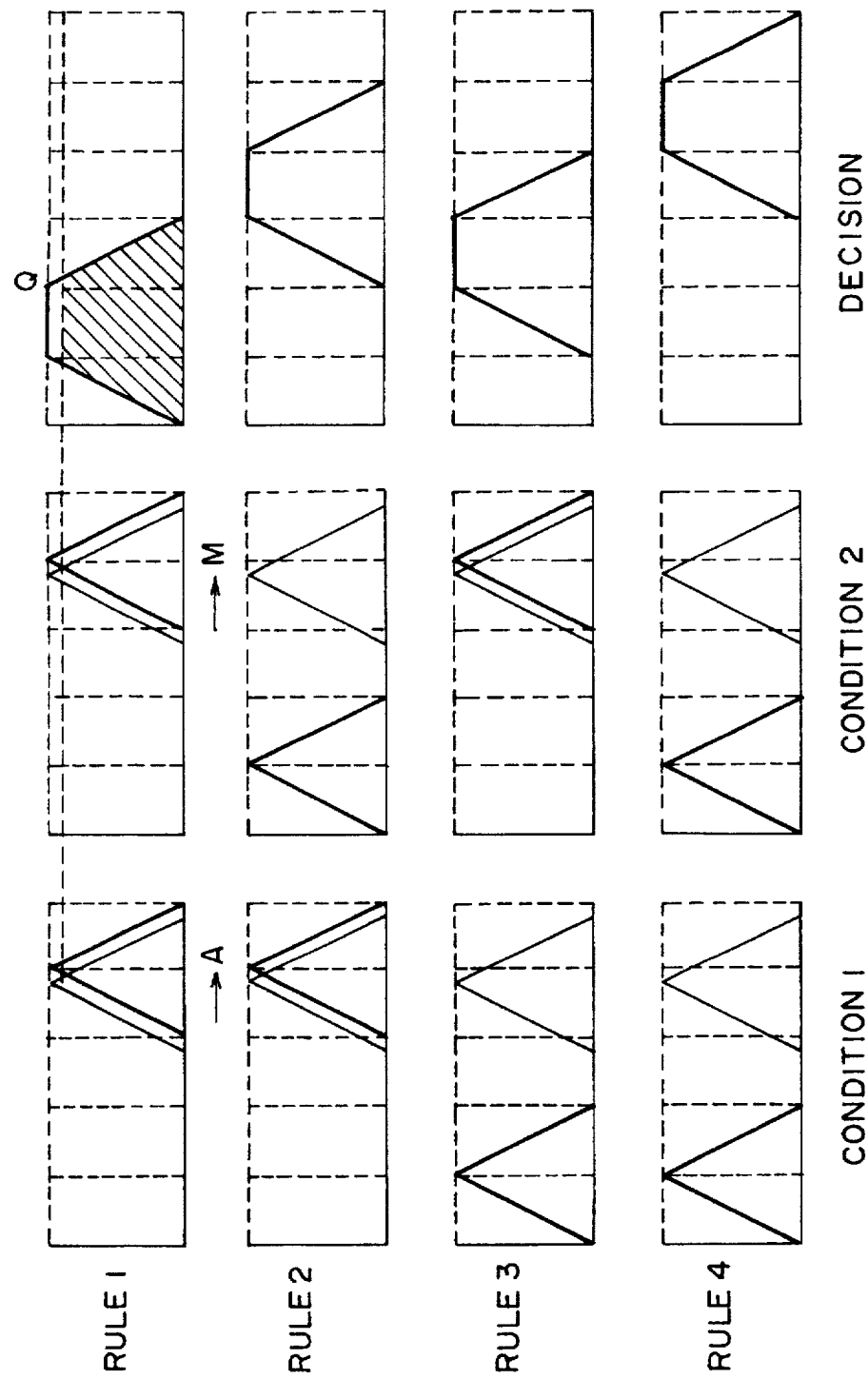

FIG. 10

| 1 | 2 K | 1 |
|---|-----|---|
| 2 K | 4 K | 2 K |
| 1 | 2 K | 1 |

K → LARGE   WEAK LOW-PASS EFFECT
K → SMALL   STRONG LOW-PASS EFFECT
$K \geq 1/4$

IMAGE PROCESSING APPARATUS

BACKGROUND OF THE INVENTION

1. Field of the Invention

The present invention relates to an image processing apparatus and, more particularly, to an image encoding.

2. Related Background Art

Hitherto, in an irreversible encoding method in a moving image encoding system, for example, a control to determine a quantization step for a code amount adjustment (rate control) is executed.

As a conventional control method of the quantization step, a method of observing a generation amount of encoded data and deciding the quantization step in accordance with the generation amount has been used.

For instance, a method whereby a virtual buffer of a code for inputting encoded data and outputting at a predetermined rate (fixed rate) is prepared and a quantization step is calculated so as to be proportional to a sufficient ratio of the buffer is used. That is, a control such that when the sufficient ratio of the buffer increases, the quantization step is enlarged and when the sufficient ratio decreases, the quantization step is reduced is executed. In a portion of a large quantization step, the generation of codes is suppressed. In a portion of a small quantization step, the generation of codes is promoted.

By controlling the sufficient ratio of the buffer to, for example, about 50%, the generation of the code is controlled so as to be constant as an average.

A process to apply a prefilter such as a low-pass filter or the like to an image before encoding is generally used in order to eliminate an aliasing distortion at the time of sampling.

Besides the fixed rate control method as mentioned above, a variable rate method in which the quantization step is fixed and a fluctuation of the code amount is allowed is known. According to this method, a quantization step such that a picture quality doesn't deteriorate to a certain reference picture quality or less is predetermined and the quantization step is fixed and used when encoding.

When a fixed rate control method such that it is limited to a system equipment using an output device of a line exchange and a constant linear density is used, however, there is a problem such that a quantization step control which attaches importance to the picture quality and in which a number of codes are allocated to an image in which a picture quality deterioration is conspicuous, to eventually suppress the picture quality deterioration, cannot be executed.

In the conventional variable rate control, since the quantization step is fixed, there is a problem such that a number of surplus codes are generated in a sequence in which the picture quality deterioration is inconspicuous.

When the prefilter is applied, hitherto, a screen is uniformly filtered irrespective of a direct encoding method, so that there is a problem such that the image is blurred as a whole.

SUMMARY OF THE INVENTION

Under such circumstances, it is an object of the invention to provide an image processing apparatus which can accomplish a high compression while preventing a deterioration of a picture quality.

In order to accomplish the object, according to one preferred embodiment, there is provided an image processing apparatus comprising: activity detecting means for detecting an activity of input image data; processing means for controlling filter coefficients in accordance with the activity detected by the activity detecting means and space filter processing the input image data; and encoding means for encoding the input image data processed by the processing means.

According to another preferred embodiment, an image processing apparatus has: activity detecting means for detecting an activity of input image data; and quantizing means for quantizing the input image data by controlling a quantization step in accordance with the activity detected by the activity detecting means.

According to still another preferred embodiment, an image processing apparatus comprises: activity detecting means for detecting an activity of input image data; quantizing means for quantizing the input image data; first deciding means for deciding a first quantization step of the quantizing means in accordance with the activity detected by the activity detecting means; encoding means for encoding the input image data quantized by the quantizing means; a buffer memory for once storing the image data encoded by the encoding means; second deciding means for deciding a second quantization step of the quantizing means in accordance with an occupation ratio of the image data in the buffer memory; and selecting means for selectively supplying the first and second quantization steps to the quantizing means.

Other objects, features, and advantages of the invention will become apparent from the following detailed description taken in conjunction with the accompanying drawings.

BRIEF DESCRIPTION OF THE DRAWINGS

FIG. 3 is a constructional block diagram showing an example of a motion magnitude detection circuit 12 in FIG. 1;

FIG. 8 is an explanatory diagram of a fuzzy inference for deciding the (Q) value as a quantization step by providing rules for the respective areas (A), (B), (C), and (D) (example in which it is judged as an area (D));

FIG. 10 is an explanatory diagram of the coefficients of the prefilter;

DETAILED DESCRIPTION OF THE PREFERRED EMBODIMENTS

An image processing apparatus of the first embodiment according to the invention will be explained hereinbelow.

Figure 1:
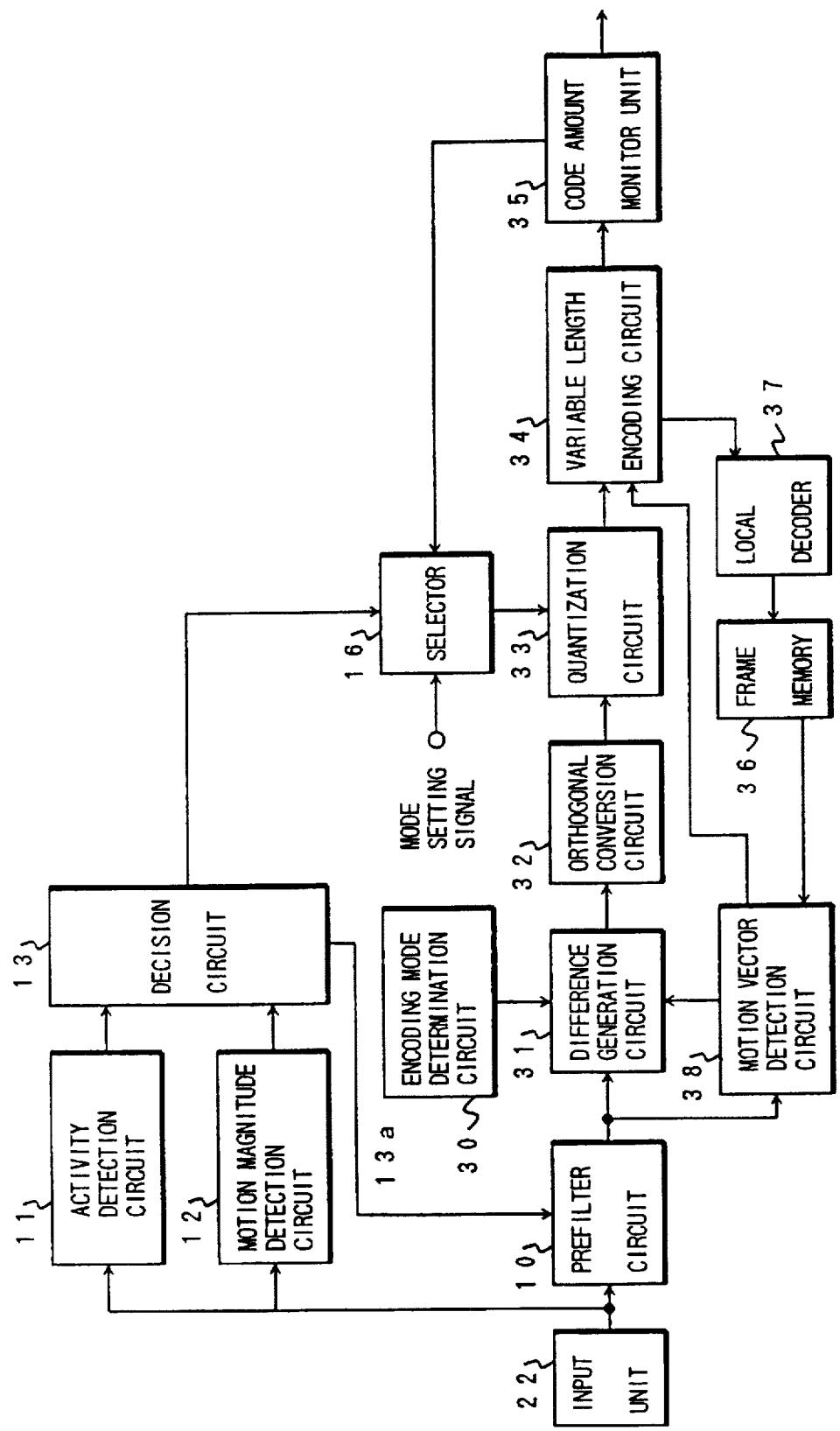
FIG. 1 is a block diagram of an image processing apparatus of an embodiment according to the invention.

FIG. 1 is a block diagram of the image processing apparatus of the first embodiment according to the invention.

In FIG. 1, with respect to image data, the image data of one picture plane from an image input unit 22 is divided into blocks each comprising a plurality of pixels. The divided block image data is supplied to a prefilter circuit 10, an activity detection circuit 11, and a motion magnitude detection circuit 12.

The prefilter circuit 10 executes a space filtering process, for example, a filtering process to enhance or weaken the effect of a low-pass filter to an image signal which is received in accordance with a filter coefficient control signal 13a from a decision circuit 13, which will be described hereinafter.

An encoding mode determination circuit 30 instructs either one of an intraframe encoding (intrapicture encoding) and an interframe encoding (interpicture encoding). As such an instruction, the circuit 30 instructs, for example, the execution of the intraframe encoding every 15 frames.

A difference generation circuit 31 obtains a difference between the image data of the frame which has already been encoded and the image data to be encoded from now on in the interframe encoding mode. The circuit 31 outputs the original image data which was inputted without obtaining the difference in the intraframe encoding mode.

Output data of the difference generation circuit 31 is converted to space frequency components by an orthogonal conversion circuit 32 and each space frequency component is quantized by a quantization circuit 33 in accordance with a quantization step, which will be described hereinafter.

The quantized data outputted from the quantization circuit 33 is encoded by a variable length encoding circuit 34 by using a Huffmann code or the like.

A code amount monitor unit 35 outputs the encoded image data at a predetermined transfer rate, determines the quantization step so that the image data encoded by the variable length encoding circuit 34 is set to a predetermined rate, and supplies to a selector 16.

A local decoder 37 reproduces the image data in order to predict the image data which is obtained on the reproduction side by an inverse quantization and an inverse conversion of the orthogonal conversion and the reproduced image data is once stored in a frame memory 36.

A motion vector detection circuit 38 detects a position vector in which the difference between a predetermined pixel block of a reference frame and a predetermined pixel block in a frame to be encoded is minimum. The vector data detected by the motion vector detection circuit 38 is encoded by the variable length encoding circuit 34.

By supplying the pixel data of the reference block shown by the vector to the difference generation circuit 31, the minimum value of the difference between the blocks is sent to the orthogonal conversion circuit 32, thereby performing what is called a motion compensation.

A mode setting signal to switch the mode for controlling the code amount at a fixed rate and the mode for controlling the code amount by a variable rate has been inputted to the selector 16. In accordance with the mode setting signal, the selector 16 switches the quantization step which is outputted from the code amount monitor unit 35 (in case of the fixed rate) and the quantization step which is outputted from the decision circuit 13 (in case of the variable rate) and supplies the switched quantization step to the quantization circuit 33.

The activity detection circuit 11 checks the frequency component of the image in the frame to be encoded, calculates an (A) value indicative of a degree of activity, and supplies the (A) value to the decision circuit 13.

The motion magnitude detection circuit 12 detects the motion vector every pixel block in a manner similar to the motion vector detection circuit 38 mentioned above, detects the number of blocks in which the magnitude of the vector is large, and supplies an (M) value indicative of the magnitude of the motion to the decision circuit 13.

The decision circuit 13 of the embodiment determines a (K) value as a prefilter coefficient and a (Q) value to control the quantization step by a fuzzy inference from the given activity and motion and supplies those values to the prefilter circuit 10 and selector 16, respectively.

A specific constructional example of the activity detection circuit 11 in FIG. 1 will now be explained with reference to FIG. 2.

Figure 2:
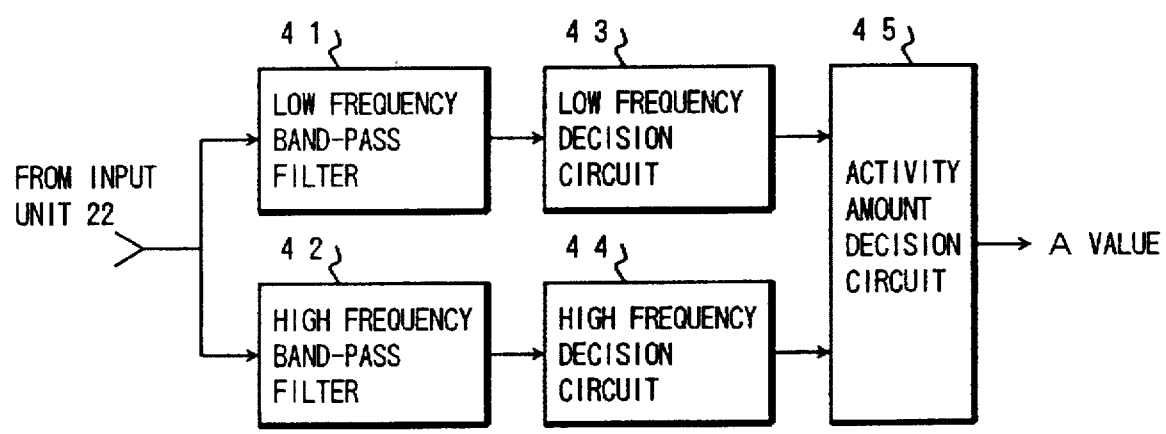
FIG. 2 is a constructional block diagram showing an example of an activity detection circuit 11 in FIG. 1.

FIG. 2 is a constructional block diagram showing an example of the activity detection circuit 11 in FIG. 1.

As shown in FIG. 2, the activity detection circuit 11 comprises: a low frequency band-pass filter 41; a high frequency band-pass filter 42; a low frequency decision circuit 43; a high frequency decision circuit 44; and an activity amount decision circuit 45.

When it is now assumed that an output of the low frequency decision circuit 43 is set to f(L) and an output of the high frequency decision circuit 44 is set to f(H), an activity amount (A value) is decided by the activity amount decision circuit 45 on the basis of the following rules.

① When f(L) is small and f(H) is small, the (A) value is set to a small value.

② When f(L) is small and f(H) is large, the (A) value is set to a large value.

③ When f(L) is large and f(H) is small, the (A) value is set to a small value.

④ When f(L) is large and f(H) is large, the (A) value is set to about an intermediate value.

⑤ When only f(L) is large, this means that the image is such that a deterioration in picture quality is conspicuous. Therefore, the (A) value is set to a small value, thereby decreasing the quantization step, which will be described hereinlater.

⑥ When only f(H) is large, this means that the image is such that even if there is a deterioration in picture quality, it is inconspicuous (the image in which the high frequency component is large and the low frequency component is small). Therefore, the (A) value is set to a large value, thereby increasing the quantization step, which will be described hereinlater. Simultaneously, the low-pass filter is strongly applied.

The (A) value as a reference is experimentally determined.

A specific constructional example of the motion magnitude detection circuit 12 in FIG. 1 will now be explained with reference to FIG. 3.

FIG. 3 is a constructional block diagram showing an example of the motion magnitude detection circuit 12 in FIG. 1.

As shown in FIG. 3, the motion magnitude detection circuit 12 comprises: a motion vector search circuit 50; a frame memory 51; a vector magnitude calculation circuit 52; a decision circuit 53; and a motion amount decision circuit 54.

The motion vector search circuit 50 uses the image data of the previous frame stored in the frame memory 51 and compares it with the image data of a target (being processed at present) frame to be encoded every (16×16) pixel block (hereinbelow, referred to as a macro block), thereby searching a motion vector of each block and calculating the magnitude of the vector by the vector magnitude calculation circuit 52.

The number of macro blocks in which the calculated vector magnitude is equal to or larger than a threshold value T1 is decided by the decision circuit 53 and the number of blocks is counted by the motion amount decision circuit 54 and the (M) value as a standardized value is outputted. Namely, in the embodiment, the data regarding the sum of the motion amounts in the picture screen is outputted as an (M) value mentioned above.

Figure 4:
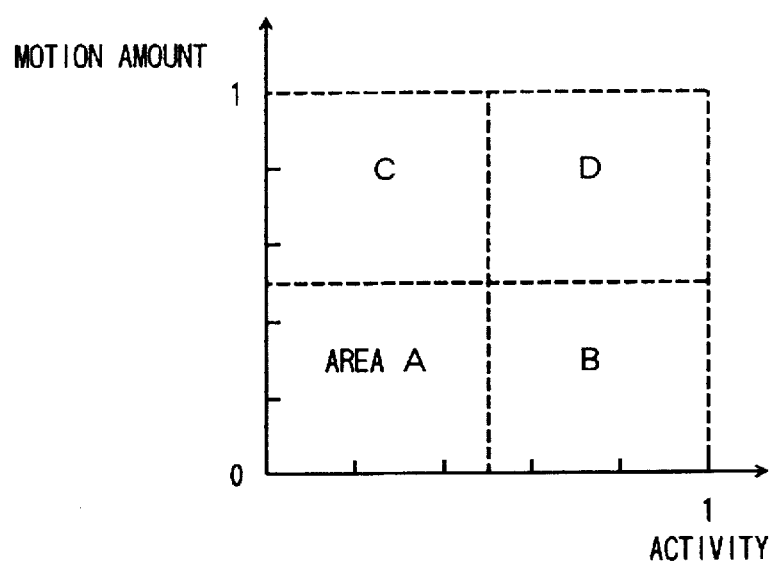
FIG. 4 is a diagram for explaining a deciding method in a decision circuit 13 in FIG. 1 in the embodiment.

FIG. 4 is a diagram to explain the deciding method in the decision circuit 13 in FIG. 1 in the embodiment. The type of the moving image sequence is divided into four areas A–D in accordance with the activity (A value) and the magnitude of the motion (M value). FIG. 4 is a diagram to explain processes in the respective areas.

Area A: An image sequence in which the activity and the motion direction are small (for example, a portrait image or the like).

Process: The low-pass filter isn't applied in the prefilter circuit 10 in FIG. 1 and the quantization step in the quantization circuit 33 is set to a large value.

Effect: The data generation amount when the image data is encoded by the quantization step can be suppressed.

Area B: An image sequence in which although the activity is large, the motion is small (for example, a scenery image of a flower garden or the like)

Process: The low-pass filter is applied in the prefilter circuit 10 in FIG. 1 and the quantization step in the quantization circuit 33 is set to about an intermediate value.

Effect: The data generation amount when the image data is encoded by blurring the image can be suppressed.

Area C: An image sequence in which although the activity is small, the motion is large (for instance, the image of an airplane in the sky or the like).

Process: The low-pass filter isn't applied in the prefilter circuit 10 in FIG. 1 and the quantization step in the quantization circuit 33 is set to about an intermediate value.

Effect: The data generation amount when the image data is encoded by the quantization step can be suppressed.

Area D: An image sequence in which the activity and motion are large (for example, an image of sports scene or the like).

Process: The low-pass filter is slightly applied in the prefilter circuit 10 in FIG. 1 and the quantization step in the quantization circuit 33 is set to a small value.

Effect: The data generation amount when the image is slightly blurred and the image data is encoded can be suppressed.

FIGS. 5 to 8 are explanatory diagrams of the fuzzy inference to decide the (Q) value as a quantization step by providing rules for respective areas (A), (B), (C), and (D) in FIG. 4 and an operation example in the decision circuit 13 in FIG. 1 will now be explained with reference to each diagram.

In each diagram:

(1) denotes means for deciding the activity amount at the first stage of the inference part (condition 1).

(2) denotes means for deciding the motion amount at the second stage of the inference part (condition 2).

(3) denotes means for deciding the quantization step Q value) (decision).

The inference part is constructed in the rules 1 to 4 so that adaptivities with the areas A, B, C, and D can be judged.

The adaptivity for the area (D) (namely, a parameter indicative of the degree of belonging to the area D) is decided in the rule 1.

Figure 5:
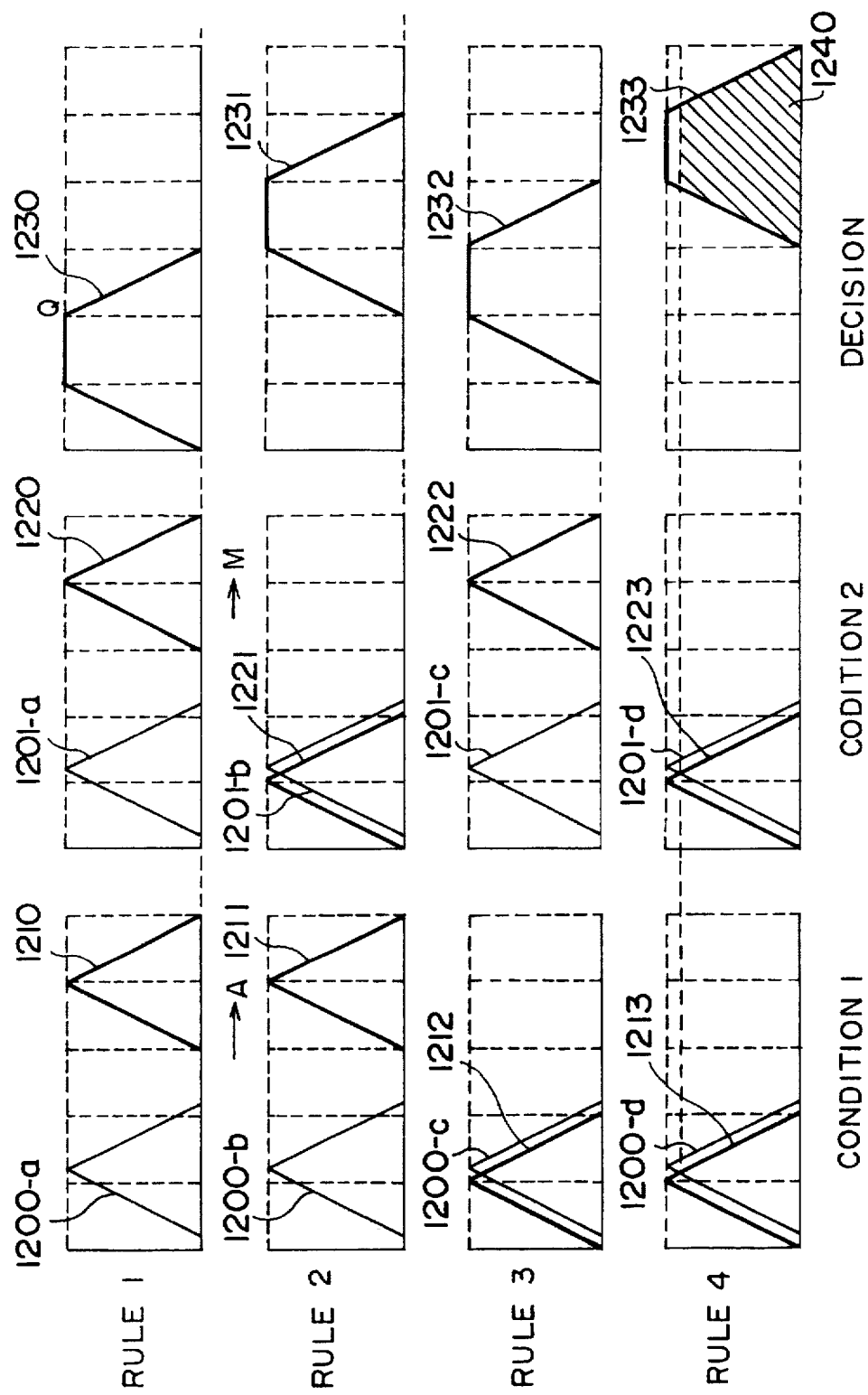
FIG. 5 is an explanatory diagram of a fuzzy inference for deciding a (Q) value as a quantization step by providing rules for respective areas (A), (B), (C), and (D) (example in which it is judged as an area (A))

As shown by reference numeral 1210 in FIG. 5, at the first stage in the inference part, a triangle (that is, membership function) of the decision is set at the position where the (A) value is large.

As shown by reference numeral 1220 in FIG. 5, at the second stage in the inference part, a triangle of the decision is set at the position where the (M) value is large.

As shown by reference numeral 1230 in FIG. 5, in the decision part, a trapezoid is set at the position where the (Q) value is small.

The adaptivity for the area (B) is decided in the rule 2.

As shown by reference numeral 1211 in FIG. 5, at the first stage in the inference part, a triangle of the decision is set at the position where the (A) value is large.

As shown by reference numeral 1221 in FIG. 5, at the second stage in the inference part, a triangle of the decision is set at the position where the (M) value is small.

As shown by reference numeral 1231 in FIG. 5, in the decision part, a trapezoid is set at the position where the (Q) value is slightly large.

The adaptivity for the area (C) is decided in the rule 3.

As shown by reference numeral 1212 in FIG. 5, at the first stage in the inference part, a triangle of the decision is set at the position where the (A) value is small.

As shown by reference numeral 1222 in FIG. 5, at the second stage in the inference part, a triangle of the decision is set at the position where the (M) value is large.

As shown by reference numeral 1232 in FIG. 5, in the decision part, a trapezoid is set at the position where the (Q) value is slightly small.

The adaptivity for the area (A) is decided in the rule 4.

As shown by reference numeral 1213 in FIG. 5, at the first stage in the inference part, a triangle of the decision is set at the position where the (A) value is small.

As shown by reference numeral 1223 in FIG. 5, at the second stage in the inference part, a triangle of the decision is set at the position where the (M) value is small.

As shown by reference numeral 1233 in FIG. 5, in the decision part, a trapezoid is set at the position where the (Q) value is large.

An example of the decision will now be described. In FIG. 5, triangles 1200-a to 1200-d indicate (A) values and triangles 1201-a to 1201-d show (M) values. The actual value is at the position of the central line of the triangle.

In the rule 1, since there is no intersection of the triangles in (1) and (2), the decision in the rule 1 is set to 0.

In the rule 2, there is no intersection of the triangles in (1) and although there is an intersection of the triangles in (2), the minimum value of the heights at the intersections is obtained and the intersection with the trapezoid is judged. Therefore, the decision in the rule 2 is set to 0.

In the rule 3, there is no intersection of the triangles in (2) and although there is an intersection of the triangles in (1), the minimum value of the heights at the intersections is obtained and the intersection with the trapezoid is judged. Therefore, the decision in the rule 3 is set to 0.

In the rule 4, there are intersections of the triangles in (1) and (2). The minimum values of the heights at the intersections are obtained and the intersection with the trapezoid is judged. Therefore, the decision in the rule 4 is set to a hatched area 1240 in FIG. 5.

Further, the sum of the decision areas from the rule 1 to rule 4 is obtained and the position of the center of gravity is set to the (Q) value. In this case, a slightly large value is decided as a (Q) value.

Figure 6:
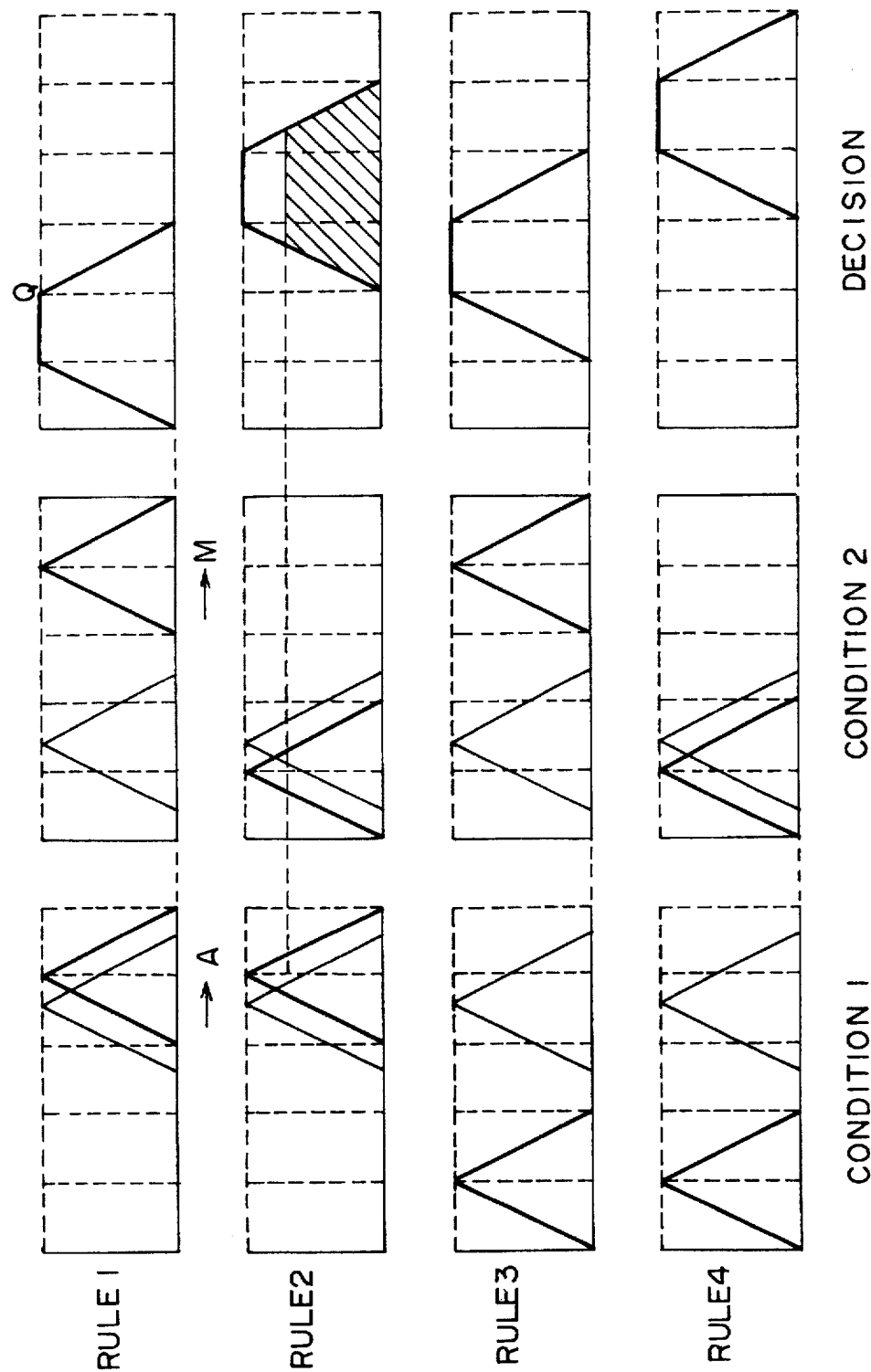
FIG. 6 is an explanatory diagram of a fuzzy inference for deciding the (Q) value as a quantization step by providing rules for the respective areas (A), (B), (C), and (D) (example in which it is judged as an area (B))

FIG. 6 shows an example of an image having the (A) and (M) values which belong to the area (B) and a slightly large value is decided as a (Q) value.

Figure 7:
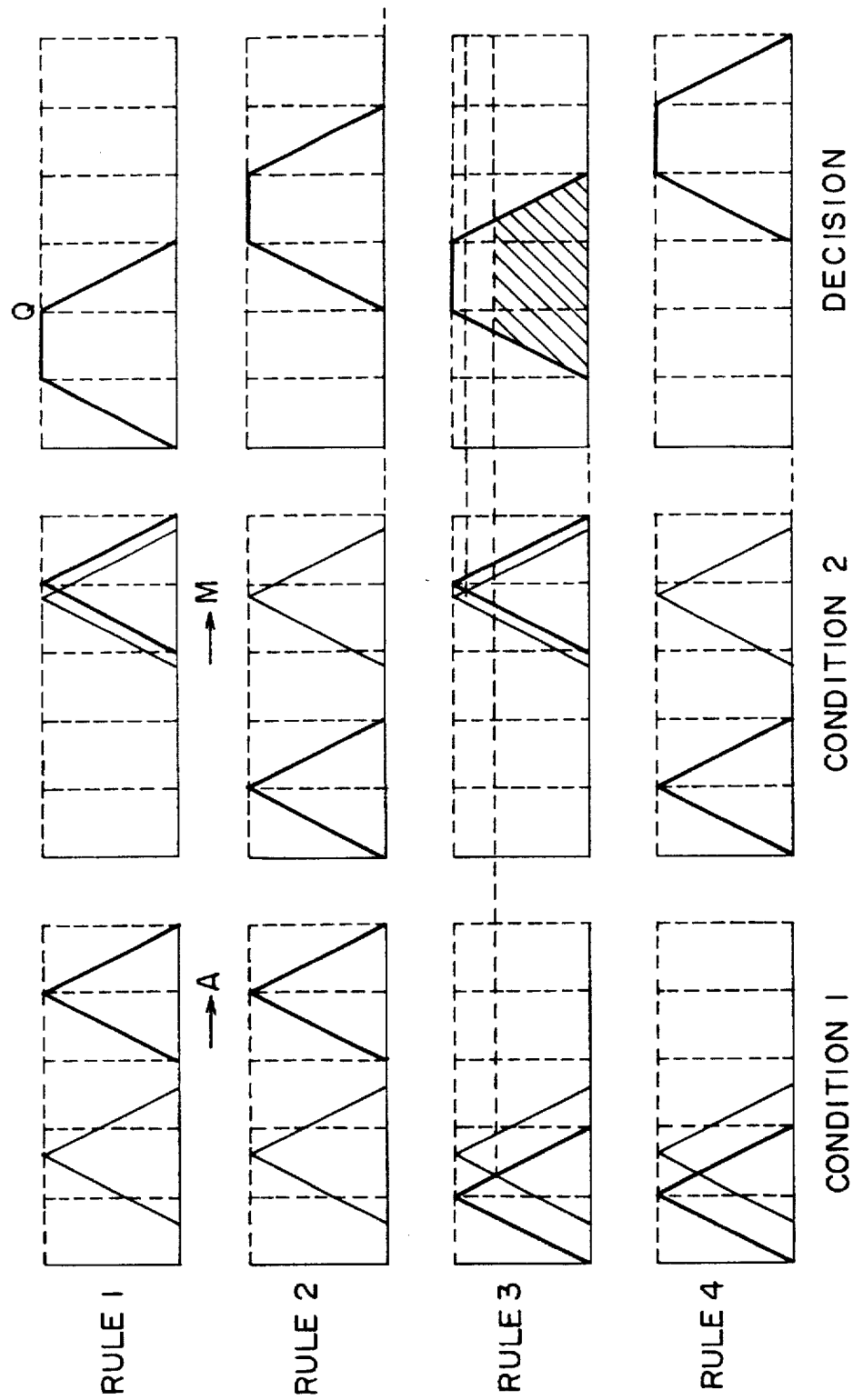
FIG. 7 is an explanatory diagram of a fuzzy inference for deciding the (Q) value as a quantization step by providing rules for the respective areas (A), (B), (C), and (D) (example in which it is judged as an area (C))

FIG. 7 shows an example of an image having the (A) and (M) values which belong to the area (C) and a slightly small value is decided as a (Q) value.

FIG. 8 shows an example of an image having the (A) and (M) values which belong to the area (D) and a slightly small value is decided as a (Q) value.

A fuzzy inference of the (K) value as a parameter to decide the magnitude of the filter which is applied to the prefilter circuit 10 in the decision circuit 13 in FIG. 1 will now be described.

Figure 9A:
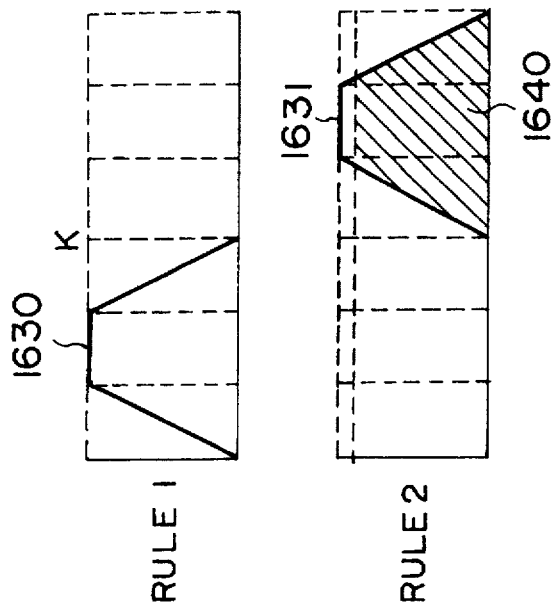
FIGS. 9A and 9B are explanatory diagrams of fuzzy inferences each for deciding a (K) value as a coefficient of a prefilter.
Figure 9B:
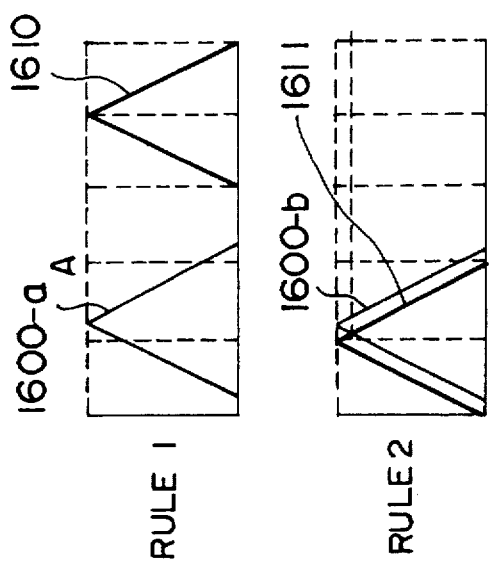

FIGS. 9A and 9B are explanatory diagrams of the fuzzy inference to decide the (K) value.

FIG. 9A relates to means for deciding an activity amount at the first stage in the inference part.

FIG. 9B relates to means for deciding the parameter (K value) to decide the magnitude of the filter. The adaptivity for the areas (B) and (D) is determined in the rule 1.

As shown by reference numeral 1610 in FIG. 9A, at the first stage in the inference part, a triangle of the decision is set at the position where the (A) value is large.

As shown by reference numeral 1630 in FIG. 9B, in the decision part, a trapezoid is set at the position where the (K) value is slightly small.

Adaptivities for the areas (A) and (C) are determined in the rule 2.

As shown by reference numeral 1611 in FIG. 9A, at the first stage in the inference part, a triangle of the decision is set at the position where the (A) value is small.

As shown by reference numeral 1631 in FIG. 9B, in the decision part, a trapezoid is set at the position where the (K) value is slightly large.

An example of the decision will now be described. In FIG. 9A, triangles 1600-a and 1600-b indicate (A) values. The actual value exists at the position of the center of the triangle.

In the rule 1, since there is no intersection of the triangles in FIG. 9A, the decision of the rule 1 is set to 0.

In the rule 2, since there is an intersection of the triangles in FIG. 9A, the height at the intersections is obtained and the intersection with the trapezoid is judged. Therefore, the decision in the rule 2 is set to a hatched area 1640 in FIG. 9B.

Further, the sum of the decision areas in the rules 1 and 2 is obtained and the position of the center of gravity of the sum is set to the (K) value. In this case, a slightly large value is decided as a (K) value.

A construction of the prefilter 10 will now be described.

An FIR filter of a (3×3) pixel block which is generally well-known is used as a prefilter circuit 10 in the embodiment.

FIG. 10 is an explanatory diagram of the coefficients of the prefilter.

In FIG. 10, the filter coefficient is constructed by a combination of 4K, 2K, and 1.

After each pixel value of the (3×3) pixel block was multiplied with the coefficient, the resultant values are added. The addition value is divided by the sum (=4K+4× 2K+4), thereby setting the quotient to the center pixel value. As the (K) value is large, the low-pass effect is weakened. As the (K) value is small, the low-pass effect is enhanced and the image is blurred. The (K) value lies within a range from ¼ to 1. Such a (K) value is decided in accordance with the foregoing fuzzy inference.

An image processing apparatus of the second embodiment according to the invention will be described hereinbelow.

Figure 11:
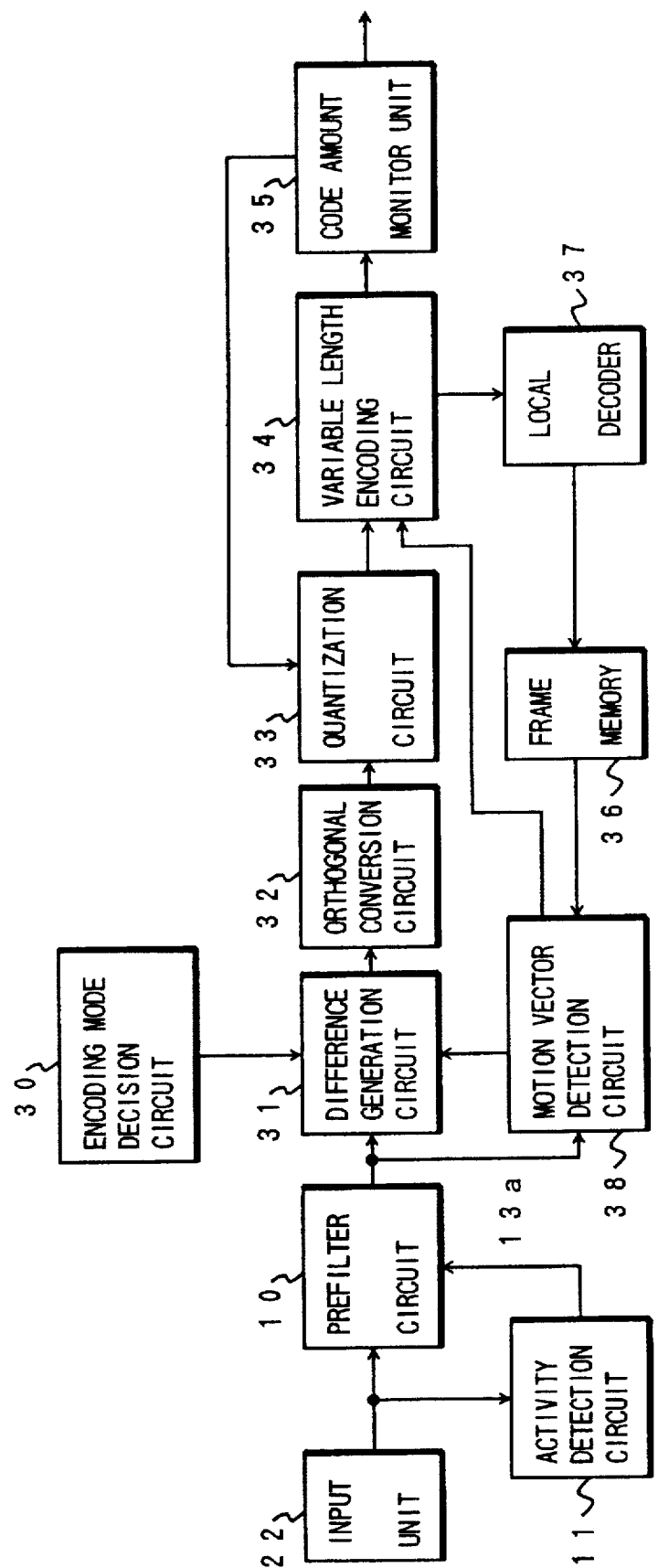
FIG. 11 is a constructional block diagram of an image processing apparatus of an embodiment when the coefficients of the prefilter of a prefilter circuit 10 are controlled in accordance with only the activity.

FIG. 11 is a constructional block diagram of an image processing apparatus of an embodiment when the coefficients of the prefilter of the prefilter circuit 10 are controlled by only the activity. Portions in FIG. 11 corresponding to those in FIG. 1 are designated by the same reference numerals and their descriptions are omitted here.

In FIG. 11, image data is supplied from the image input unit 22 to the prefilter circuit 10 and activity detection circuit 11.

The prefilter circuit 10 executes a filtering process to enhance or weaken the effect of the low-pass filter in accordance with the filter coefficient control signal 13a from the decision circuit 13.

The encoding mode determination circuit 30 instructs either one of the intraframe encoding and the interframe encoding. The difference generation circuit 31 obtains a difference between the image data of the frame which has already been encoded and the image data to be encoded from now on in the interframe encoding mode. The circuit 31 outputs the original image data without obtaining the difference in the intraframe encoding mode.

Output data from the difference generation circuit 31 is converted to frequency components by the orthogonal conversion circuit 32 and each frequency component is quantized by the quantization circuit 33.

The component data is encoded by the variable length encoding circuit 34.

The encoded data outputted from the variable length encoding circuit 34 is supplied to the code amount monitor unit 35. The code amount monitor unit 35 outputs the encoded data at a predetermined transfer rate, determines the quantization step so that the encoded data which is outputted from the variable length encoding circuit 34 is set to a predetermined rate, and supplies to the quantization circuit 33.

The local decoder 37 forms the image data which is obtained on the reproduction side and stores it in the frame memory 36.

The motion vector detection circuit 38 detects a position vector such that the difference between the pixel block in a reference frame and the pixel block in a frame to be encoded is minimum. The position vector data is encoded by the variable length encoding circuit 34. By supplying the position vector to the difference generation circuit 31, the minimum value data of the difference between the blocks is outputted to the orthogonal conversion circuit 32.

The activity detection circuit 11 determines the (K) value as a filter coefficient by using only the (A) value.

An image processing apparatus of the third embodiment according to the invention will now be explained hereinbelow.

Figure 12:
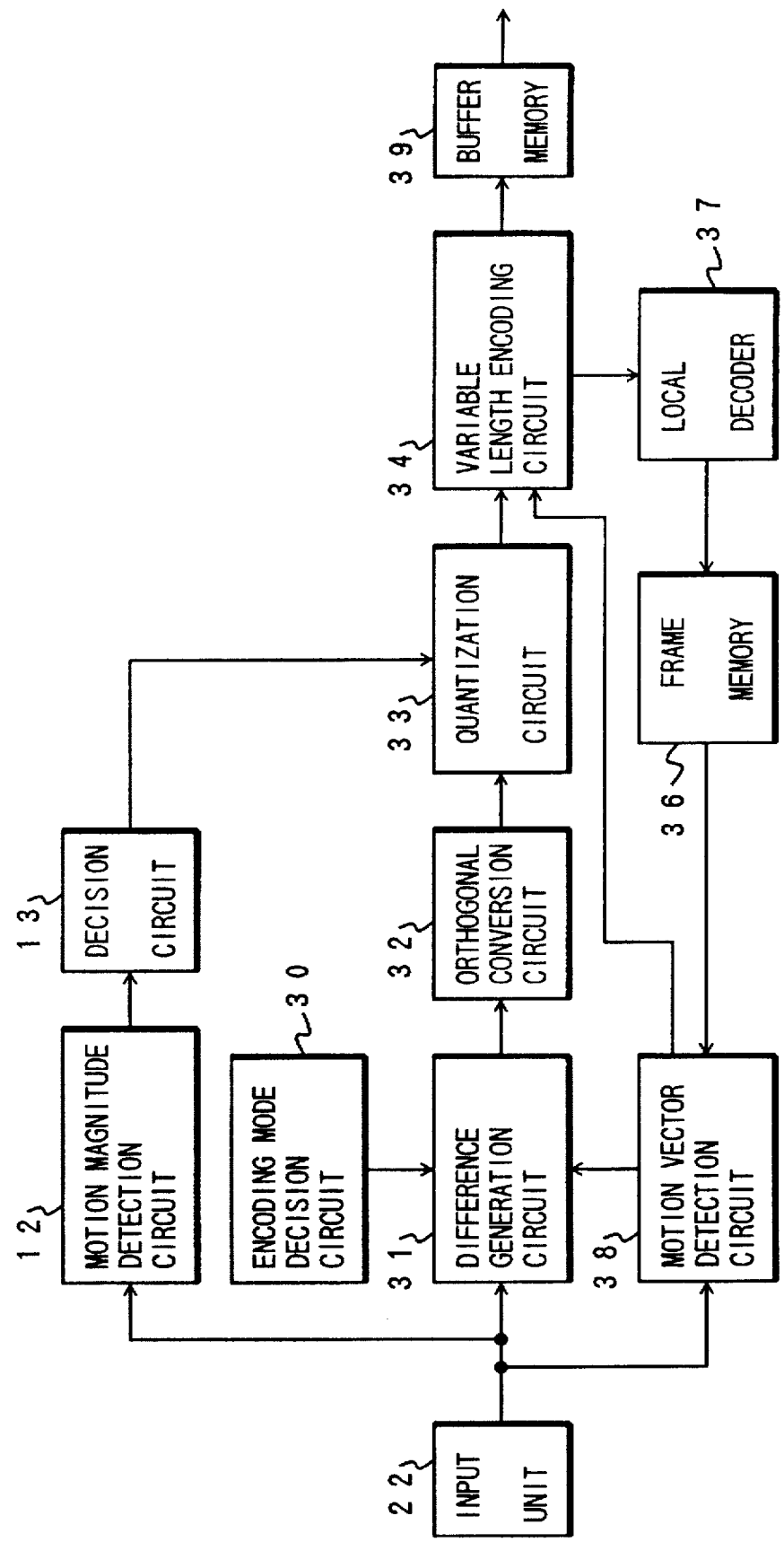
FIG. 12 is a constructional block diagram of an image processing apparatus of an embodiment when a quantization parameter is controlled by only the magnitude of a motion.

FIG. 12 is a constructional block diagram of an image processing apparatus of an embodiment when the quantization parameter is controlled by only the magnitude of the motion. Portions in FIG. 12 corresponding to those in FIG. 1 are designated by the same reference numerals and their descriptions are omitted here.

In FIG. 12, image data is supplied from the image input unit 22 to the motion magnitude detection circuit 12, difference generation circuit 31, and motion vector detection circuit 38.

The encoding mode determination circuit 30 instructs either one of the intraframe encoding and the interframe encoding. The difference generation circuit 31 obtains a difference between the image data of the frame which has already been encoded and the image data to be encoded from now on in the interframe encoding mode. The circuit 31 outputs the original image data without obtaining the difference in the intraframe encoding mode.

Output data from the difference generation circuit 31 is converted to frequency components by the orthogonal conversion circuit 32 and each frequency component is quantized by the quantization circuit 33.

The quantized image data is encoded by the variable length encoding circuit 34.

The encoded data outputted from the variable length encoding circuit 34 is supplied to a buffer memory 39. The buffer memory 39 outputs the encoded data at a predetermined transfer rate.

The local decoder 37 forms the image data which is obtained on the reproduction side and stores it in the frame memory 36.

The motion vector detection circuit 38 detects a position vector such that the difference between the pixel block in the reference frame and the pixel block in the frame to be encoded is minimum. The position vector data is encoded by the variable length encoding circuit 34. By supplying the position vector to the difference generation circuit 31, the minimum value data of the difference between the blocks is outputted to the orthogonal conversion circuit 32.

The motion magnitude detection circuit 12 detects a motion vector every pixel block in a manner similar to the motion vector detection circuit 38, detects the number of blocks in which the magnitude of the vector is equal to or larger than a predetermined value, and supplies to the decision circuit 13. The decision circuit 13 determines the (Q) value to control the quantization step by a method such as a fuzzy inference or the like and supplies the (Q) value to the quantization circuit 33.

According to the embodiments as mentioned above, the activity of the image and/or the magnitude of the motion of the image are detected and the quantization step and/or the coefficients of the prefilter are determined by the activity and/or the magnitude of the motion, so that the encoding at a high picture quality can be performed with a minimum code amount.

The invention can be embodied by other various forms without departing from the spirit and main features of the invention.

For instance, although the embodiments have been explained with respect to the case shown in FIG. 10 as a prefilter, the invention is not limited to only such a case but other filters can be also used.

The invention is not limited to the case of smoothing as mentioned above in the embodiments but an edge can be also emphasized. In such a case, coefficients of a filter for the edge emphasis can be also switched in accordance with the foregoing activity.

Although the activity has been detected by the circuit shown in FIG. 2 in the embodiments, the invention is not limited to such a case. The activity can be also calculated by another method, for example, what is called a distribution value of the levels of a plurality of pixels in each block.

The circuit to detect the magnitude of the motion is not limited to the circuit shown in FIG. 3. The motion between the two-preceding frame and the relevant frame can be also detected.

Although the embodiments have been described with respect to the frame image as a target, a field image can be also similarly dealt.

The magnitudes of the encoded block and the block of the loop filter process are not limited to the magnitudes of the blocks described in the embodiments.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:
   input means for inputting image data;
   activity detecting means for detecting an activity of the image data input by said input means, the activity corresponding to spatial frequency content of the image data;
   filtering means for performing a space filtering process on the image data input by said input means, by controlling filter coefficients in accordance with the activity detected by said activity detecting means; and
   encoding means for encoding the image data processed by said filtering means.

2. An apparatus according to claim 1, wherein said space filtering process is a smoothing process.

3. An apparatus according to claim 1, further comprising motion detecting means for detecting the motion of the image data input by said input means,
   and wherein said filtering means controls the filter coefficients in accordance with the activity detected by said activity detecting means and the motion detected by said motion detecting means.

4. An apparatus according to claim 3, wherein said processing means controls the filter coefficients by a fuzzy inference.

5. An apparatus according to claim 1, wherein said encoding means includes quantizing means for quantizing the input image data processed by said filtering means,
   and wherein a quantization step of said quantizing means is controlled in accordance with the activity detected by said activity detecting means.

6. An apparatus according to claim 1, wherein said encoding means includes:
   quantizing means for quantizing the image data processed by said filtering means;
   variable-length encoding means for variable-length encoding the image data quantized by said quantizing means;
   a buffer memory for once storing the image data encoded by said variable-length encoding means,
   wherein a quantization step for quantizing the image data is controlled in accordance with an occupation ratio of the image data in said buffer memory.

7. An image processing apparatus according to claim 1, wherein the activity is detected by comparing a high spatial frequency component of the image data to a low spatial frequency component of the image data.

8. An image processing method comprising:

an inputting step of inputting image data;

an activity detecting step of detecting an activity of the image data input in said inputting step, the activity corresponding to spatial frequency content of the image data;

a filtering step of performing a space filtering process on the image input in said inputting step, by controlling filter coefficients in accordance with the activity detected in said activity detecting step; and an encoding step of encoding the image data processed in said filtering step.

9. A method according to claim 8, wherein said space filtering process is a smoothing process.

10. A method according to claim 8, further comprising a motion detecting step of detecting motion of the image data input in said inputting step, and wherein said filtering step controls the filter coefficients in accordance with the activity detected in said activity detecting step and the motion detected in said motion detecting step.

11. A method according to claim 10, wherein said processing step controls the filter coefficients by a fuzzy inference.

12. A method according to claim 8, wherein said encoding step includes a quantizing step of quantizing the input image data processed in said filtering step, and wherein a quantization step used by said quantizing step is controlled in accordance with the activity detected in said activity detecting step.

13. A method according to claim 8, wherein said encoding step includes:

a quantizing step for quantizing the image data processed in said filtering step;

a variable-length encoding step of variable-length encoding the image data quantized in said quantizing step; and a storage step of storing in a buffer memory the image data encoded in said variable-length encoding steps, wherein a quantization step for quantizing of the image data is controlled in accordance with an occupation ratio of the image data in the buffer memory.

14. An image processing method according to claim 8, wherein the activity is detected by comparing a high spatial frequency component of the image data to a low spatial frequency component of the image data.

\* \* \* \* \*

UNITED STATES PATENT AND TRADEMARK OFFICE
CERTIFICATE OF CORRECTION

PATENT NO. : 5,790,195

DATED : August 4, 1998

INVENTOR(S): HIDEFUMI OHSAWA

It is certified that error appears in the above-identified patent and that said Letters Patent is hereby corrected as shown below:

COLUMN 1
Line 24, "reduced" should read --reduced,--.

COLUMN 5
Line 35, "isn't" should read --is not--;
Line 42, "like)" should read --like).--.

COLUMN 10
Line 6, "two-preceding frame" should read
    --two preceding frames--;
Line 10, "dealt" should read --dealt with--.
Line 59, "means;" should read --means; and--.

COLUMN 12
Line 17, "steps," should read -- step--.

Signed and Sealed this

Fourth Day of May, 1999

Attest:

Q. TODD DICKINSON

Attesting Officer    Acting Commissioner of Patents and Trademarks